United States Patent
Liang

(10) Patent No.: US 9,258,510 B2
(45) Date of Patent: Feb. 9, 2016

(54) METHOD OF OPTICAL TRACKING A FRAME OF AN OBJECT AND RELATED OPTICAL TRACKING SYSTEM

(71) Applicant: PixArt Imaging Inc., Hsin-Chu (TW)

(72) Inventor: Chia-Cheun Liang, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 78 days.

(21) Appl. No.: 14/225,444

(22) Filed: Mar. 26, 2014

(65) Prior Publication Data

US 2015/0161448 A1 Jun. 11, 2015

(30) Foreign Application Priority Data

Dec. 10, 2013 (TW) .............................. 102145453 A

(51) Int. Cl.
*G06K 9/00* (2006.01)
*H04N 5/44* (2011.01)
*G06K 9/20* (2006.01)
*G06K 9/32* (2006.01)

(52) U.S. Cl.
CPC ............ *H04N 5/4403* (2013.01); *G06K 9/2027* (2013.01); *G06K 2009/3291* (2013.01)

(58) Field of Classification Search
CPC .......................... H04N 5/4403; G06K 9/00711
USPC ......................................................... 382/103
See application file for complete search history.

(56) References Cited

U.S. PATENT DOCUMENTS

2013/0021237 A1 1/2013 Kao
2013/0168538 A1* 7/2013 Liang ..................... G01S 3/784
250/226

FOREIGN PATENT DOCUMENTS

TW 201308132 2/2013
TW 201349032 12/2013

OTHER PUBLICATIONS

Steve, "The First Book of Moses Called Genesis", 2006, Retrieved on Jul. 29, 2015 from Internet <URL:http://www.genevabible.org/files/Geneva_Bible/Old_Testament/Genesis.pdf>.*

* cited by examiner

*Primary Examiner* — Gregory F Cunningham
(74) *Attorney, Agent, or Firm* — Winston Hsu; Scott Margo

(57) ABSTRACT

An optical tracking method disclosed in the present invention includes obtaining a continuous image set containing a reference light source during a period, and identifying an image characteristic variation of the continuous image set. The reference light source is set at a constant illuminated mode, and generates a known illumination variation during the period. The optical tracking method further includes comparing the image characteristic variation with the known illumination variation to determine whether a predetermined function is actuated. The predetermined function calculates position information of the reference light source on an image of the continuous image set.

28 Claims, 4 Drawing Sheets

METHOD OF OPTICAL TRACKING A FRAME OF AN OBJECT AND RELATED OPTICAL TRACKING SYSTEM

BACKGROUND OF THE INVENTION

1. Field of the Invention

The present invention relates to a method of optically tracking a frame and a related optical tracking system, and more particularly, to a method of optically tracking a frame of an object and a related optical tracking system with preferred resistance to environmental error.

2. Description of the Prior Art

A conventional multipoint object tracking method regularly triggers a reference point to generate scintillating light source, an image sensor synchronously obtains continuous images which contain the reference point, and a controller analyzes regular variation of dark matters and bright matter of the continuous images to find out position of the reference point, so as to generate coordinates for the object tracking method. Capturing frequency of the image sensor and the scintillating light source of the reference point are in synchronization with tiny tolerance. The reference point controller of the conventional multipoint object tracking method needs greater precision, and complexity of the synchronous controlling technique accordingly increases product cost. In addition, background light source in household environment and work environment is scintillated by regular frequency, and the conventional multipoint object tracking method is difficult to distinguish the scintillating light source of the reference point from background error with the regular frequency. Half of an operating period of the reference point belongs to an Off-mode (the light source is shut down or switched to low illumination) when the reference point is regularly scintillated, and an amount of images including the effective reference point detected by the image sensor is decreased. Therefore, resolution of the conventional multipoint object tracking method applied to the background error with the regular frequency is worse, and the amount of the effective reference point is less, so that the conventional multipoint object tracking method has drawbacks of low tracking efficiency and low remote controlling performance.

SUMMARY OF THE INVENTION

The present invention provides a method of optically tracking a frame and a related optical tracking system with preferred resistance to environmental error for solving above drawbacks.

According to the claimed invention, a method of optically tracking a frame is disclosed. The method includes obtaining a sequential image set containing a reference light source during a period, and identifying an image characteristic variation of the sequential image set. The reference light source is set at a constant illuminated mode, and generates a known illumination variation during the period. The method further includes comparing the image characteristic variation to the known illumination variation to determine whether a predetermined function is actuated. The predetermined function calculates position information of the reference light source on an image of the sequential image set.

According to the claimed invention, the method further includes determining whether capturing time of an inconstant illuminated image of the sequential image set conforms to the known illumination variation. When the inconstant illuminated image conforms to the known illumination variation, an object with the known illumination variation on the inconstant illuminated image is identified as the reference light source, and corresponding coordinates is generated according to position information of the reference light source.

According to the claimed invention, an optical tracking system includes a display and a remote controller. The display includes at least one reference light source. The remote controller is adapted to obtain a distance and an angle of the remote controller relative to the display, so as to generate the corresponding coordinates. The remote controller includes an image sensor and a control unit. The image sensor obtains a sequential image set, which contains the reference light source, during a period. The control unit is electrically connected to the image sensor. The control unit drives the reference light source to generate a known illumination variation during the period. The control unit further identifies an image characteristic variation of the sequential image set, and compares the image characteristic variation to the known illumination variation, so as to determine whether a predetermined function is actuated.

According to the claimed invention, an optical tracking system includes a display and a remote controller. The display includes at least one reference light source, and the reference light source generates a known illumination variation during a period. The remote controller is adapted to obtain a distance and an angle of the remote controller relative to the display, so as to generate the corresponding coordinates. The remote controller includes an image sensor and a control unit. The image sensor obtains a sequential image set, which contains the reference light source, during a period. The control unit is electrically connected to the image sensor. The control unit identifies an image characteristic variation of the sequential image set, and compares the image characteristic variation to the known illumination variation, so as to determine whether a predetermined function is actuated.

The present invention can utilize the reference light source with random scintillation to validly increase object tracking efficiency of the optical tracking system, and to simplify software/hardware of the optical tracking system for low product cost.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Please refer to FIG. 1. FIG. 1 is a diagram of an optical tracking system 10 according to an embodiment of the present invention. The optical tracking system 10 includes a display 12 and a remote controller 14. The remote controller 14 can obtain a distance and an angle of the remote controller 14 relative to the display 12, so as to generate corresponding coordinates for remote control. The display 12 includes at least one reference light source 16 disposed on an upper side or a low side of the display 12. The remote controller 14 includes an image sensor 18 and a control unit 20. The control unit 20 is electrically connected to the image sensor 18. The reference light source 16 outputs an optical signal with identifiable characteristic to generate a known illumination variation. For example, the optical signal may have specific scintillating frequency or the optical signal is scintillated during a specific period. The image sensor 18 obtains a sequential image set which contains the reference light source 16. The control unit 20 connects the image sensor 18 to analyze an image characteristic variation of the sequential image set, finds out an image which conforms to the known illumination variation of the reference light source 16, and determines position information of the reference light source 16 on the image, so as to acquire a reference point of an optical track technique.

Figure 1:
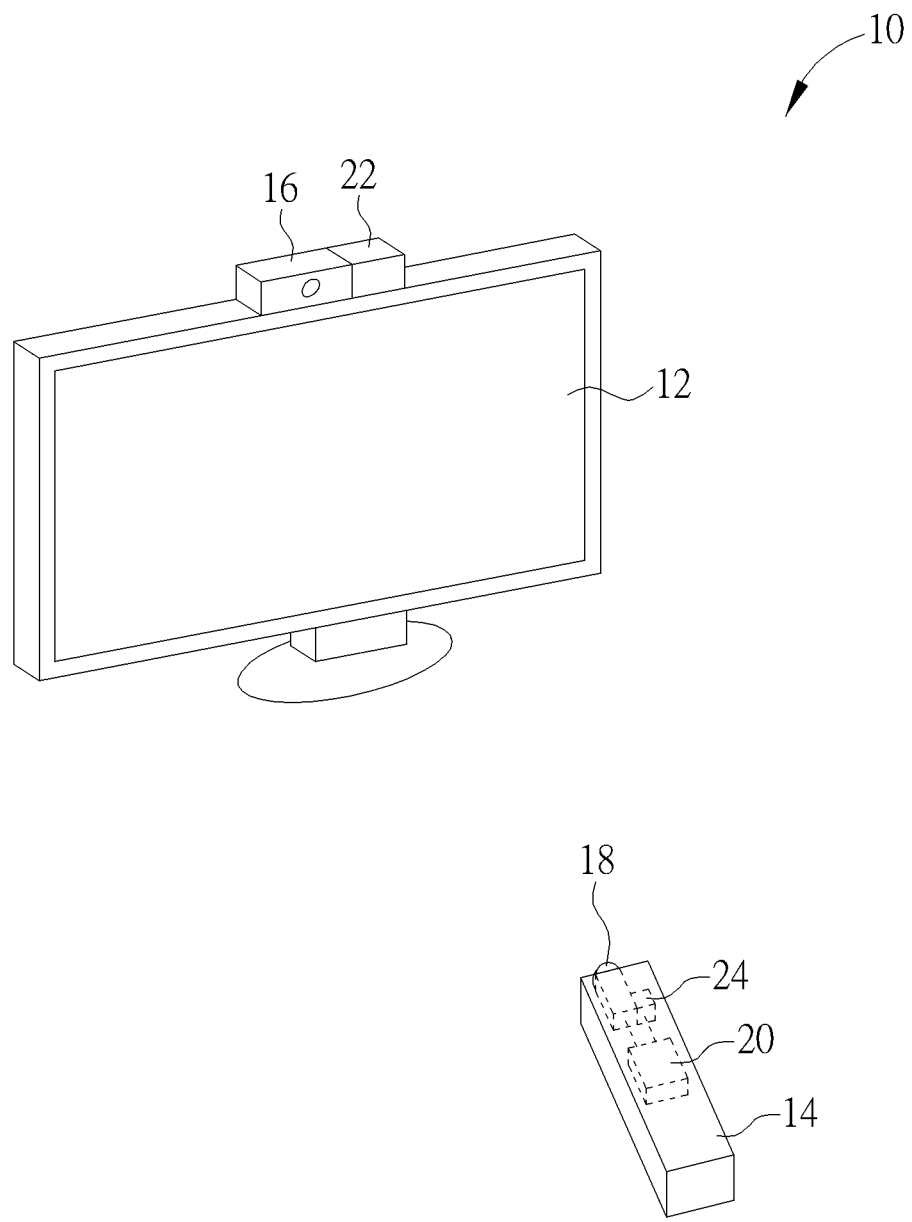
FIG. 1 is a diagram of an optical tracking system according to an embodiment of the present invention.

The present invention provides a high-quality filtering technique. The reference light source 16 is preferably set at a constant illuminated mode, and can be shut down (switched to an Off-mode) once or several times during a period to generate the known illumination variation according to an environmental error interference. The known illumination variation is captured by the remote controller 14 for analysis. The reference light source 16 recovers to the constant illuminated mode after the known illumination variation is completed. The present invention utilizes a random algorithm or a predetermined algorithm to calculate properties of the known illumination variation, such as length of the period, trigger timing of the period, or both the length and the trigger timing of the period. The known illumination variation may include a set of continuous variation including at least one dark level (the dark image of an object within an image) and at least one bright level (the bright image of the object within the image). The known illumination variation can be a regular signal source with periodic property or aperiodic property. The illumination variation of the reference light source 16 is a known parameter of the remote controller 14, so the remote controller 14 can easily distinguish difference between the reference light source 16 and the environmental error.

It should be mentioned that the reference light source 16 switched to the constant illuminated mode can be selectively set at a highest illumination, a minor illumination or a low illumination. Illumination value of the reference light source 16 is not limited to a specific range. All processes capable of keeping the reference light source 16 at the constant illuminated mode (which means the reference light source 16 is not shut down) during an illuminative period belongs to the scope of the present invention. The known illumination variation can include a plurality of embodiments. For example, the reference light source 16 is shut down temporarily within a selected period, to generate the known illumination variation including the dark level with fixed length. Further, the reference light source 16 is shut down repeatedly during the selected period, to generate the known illumination variation including the dark level and the bright level with fixed variation. Besides, the reference light source 16 can be actuated to generate an illumination variation including at least two different illumination levels (which have dissimilar illumination with each other) during the selected period. The two different illumination levels may include a first illumination level and a second illumination level, wherein the first illumination level is the same as an illumination of the constant illuminated mode, and the second illumination level is half of the illumination of the constant illuminated mode. The two different illumination levels further may include the first illumination level the same as the illumination of the constant illuminated mode, and the second illumination level matter without brightness (which means the dark level).

When exposure time of the image sensor 18 simultaneously covers an On-mode (the constant illuminated mode) and the Off-mode (the inconstant illuminated image) of the reference light source 16, the control unit 20 is difficult to accurately determine property of the image characteristic variation. Duty cycle of the image sensor 18 is preferably smaller than the length of the known illumination variation (which means turn-off time of the reference light source 16), to ensure that the image sensor 18 can obtain an effective inconstant illuminated image when the reference light source 16 is shut down or switched to the low illumination during each exposure time. Thus, the exposure time of the image sensor 18 is smaller than the minimum turn-off time of the reference light source 16. As the illumination variation of the reference light source 16 is the known parameter of the remote controller 16, the control unit 20 can identify the image characteristic variation, which conforms to the known illumination variation, from the continuous images set detected by the image sensor 18. The image characteristic variation can be capturing time and/or an amount of the inconstant illuminated image. When the capturing time and/or the amount of the inconstant illuminated image conform to the known illumination variation, the control unit 20 determines that an object with the known illumination variation on the inconstant illuminated image represents the reference light source 16, so as to acquire the reference point of the optical tracking technique. The other image characteristic which does not conform to the known illumination variation represents as the environmental error, and can be omitted herein without consideration.

Figure 2:
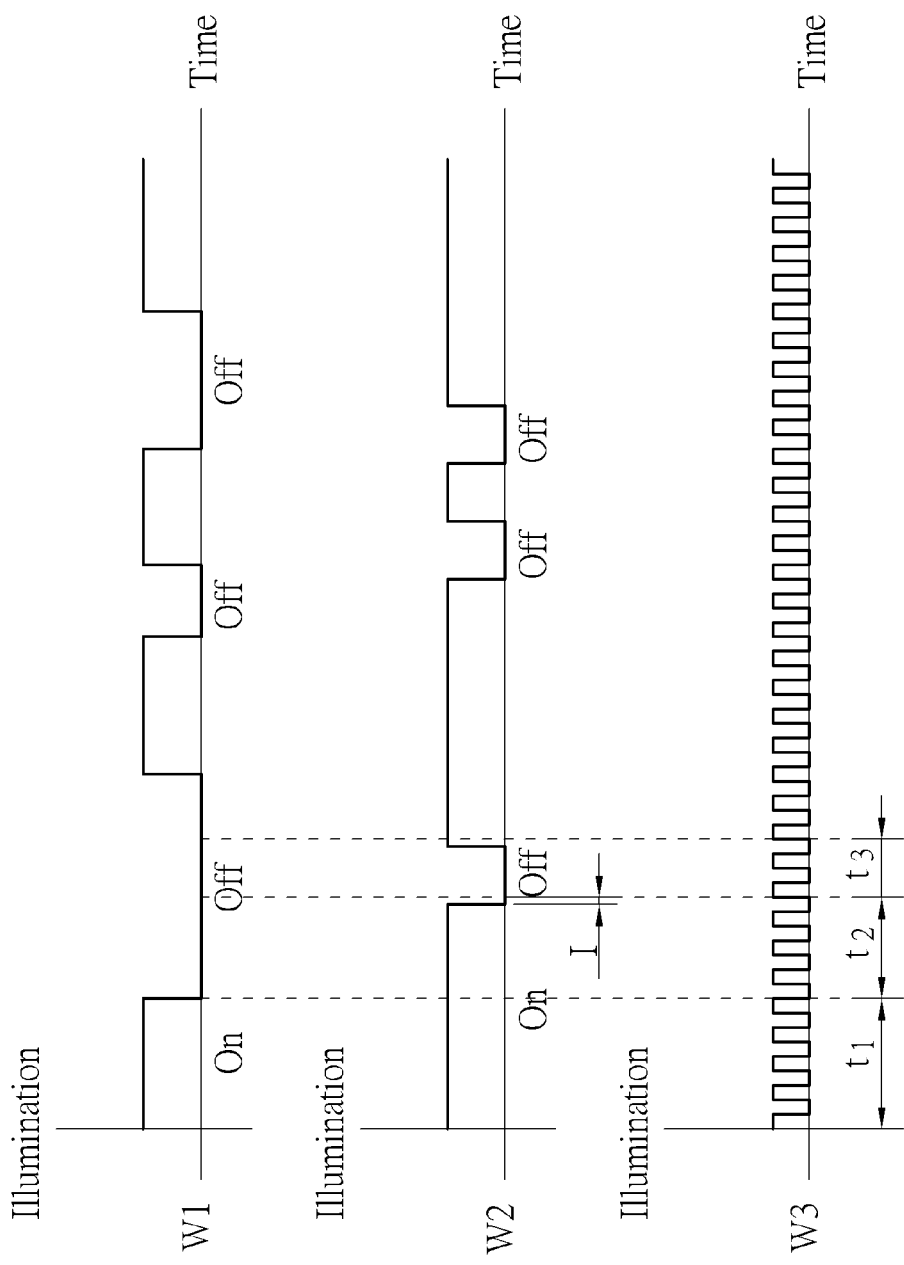
FIG. 2 is a waveform comparative diagram of a reference light source and an image sensor according to the embodiment of the present invention.

Please refer to FIG.2. FIG.2 is a waveform comparative diagram of the reference light source 16 and the image sensor 18 according to the embodiment of the present invention. The environmental error W1 can be a scintillated optical signal with regular property or irregular property. The known illumination variation W2 of the reference light source 16 can be generated by the random algorithm or the predetermined algorithm. The reference light source 16 is set at the constant illuminated mode except the period, such as the object tracking method is not executed. As the control unit 20 cannot identify the real reference point, the reference light source 16 accordingly generates the known illumination variation W2, and the control unit 20 identifies the image characteristic variation of the known illumination variation W2 to determine whether a predetermined function of the optical tracking technique is actuated. Therefore, the known illumination variation W2 preferably can be the aperiodic variation, and timing of generating the image characteristic is inconstant. Length and trigger timing of the Off-mode of the known illumination variation W2 are the known properties of the optical tracking system 10. A capturing frequency W3 of the image sensor 18 is higher, so the duty cycle of the image sensor 18 is smaller than the length of the Off-mode of the known illumination variation W2. Synchronization of the known illumination variation W2 of the reference light source 16 and the capturing frequency W3 of the image sensor 18 is unnecessary. The image sensor 18 can easily identify difference between the environmental error W1 and the known illumination variation W2 to acquire the reference point since the reference light source 16 generates the known illumination variation W2 during the period loosely.

As shown in FIG.2, the reference light source 16 is set at the constant illuminated mode (the On-mode) during a first period t1, the image sensor 18 captures the constant illuminated image (the high illumination image) during the first period t1 to acquire the effective reference point. The image sensor 18 captures the inconstant illuminated image (the low illumination image or the dark image) during a second period t2. Because the inconstant illuminated image captured during the second period t2 does not conform to the known illumination variation W2, the control unit 20 determines that the inconstant illuminated image corresponds to the Off-mode of the environmental error W1. Though the error is shut down during the second period t2, the reference light source 16 still keeps at the constant illuminated mode. In the meantime, the control unit 20 can individually identify the different image characteristics, which means one of object images (the reference light source 16) is determined as the constant illuminated mode and an another object image (the environmental error) is determined as the inconstant illuminated mode. The image sensor 18 captures the inconstant illuminated image (the low illumination image or the dark image) during a third period t3. The control unit 20 individually identifies the objects on the image, such as identify procedures of the above-mentioned second period t2. When the inconstant illuminated mode of the object image conforms to the Off-mode of the known illumination variation W2, the object can be determined as the reference light source 16, and position information of the reference light source 16 on the image is calculated accordingly. The reference light source 16 not only can keep the turn-off time with specific length during the third period t3 (the dark level has the fixed length), but also can generate the variation including the dark level and the bright level with specific frequency.

In a first embodiment of the present invention, the remote controller 14 drives the reference light source 16 to generate the known illumination variation. In a second embodiment of the present invention, the display 12 actively drives the reference light source 16 to generate the known illumination variation. As shown in FIG.1, the display 12 further includes a first communication unit 22 electrically connected to the reference light source 16. The remote controller 14 further includes a second communication unit 24 electrically connected to the control unit 20. In the first embodiment, the control unit 20 outputs a control signal to the display 12 via the first communication unit 22 and the second communication unit 24. A system delay difference I may be generated in transmission of the control signal due to environmental factors, such as voltage, temperature and humidity. The reference light source 16 executes the known illumination variation by the control signal, the image sensor 18 obtains the related sequential image set accordingly, and the control unit 20 can identify the object with the known illumination variation on the sequential image set as the reference light source 16 via consideration of the system delay difference I and the other controllable factors.

In the second embodiment, the reference light source 16 actively generates the known illumination variation, and outputs a notice message about the known illumination variation to the remote controller 14 via the first communication unit 22 and the second communication unit 24. The image sensor 18 is actuated by the notice message to obtain the sequential image set. Then, the control unit 20 can filter the environmental error and identify the object with the known illumination variation on the sequential image set as the reference light source 16 via calculation of transmitting time of the notice message, the system delay difference I and the other controllable factors.

Figure 3:
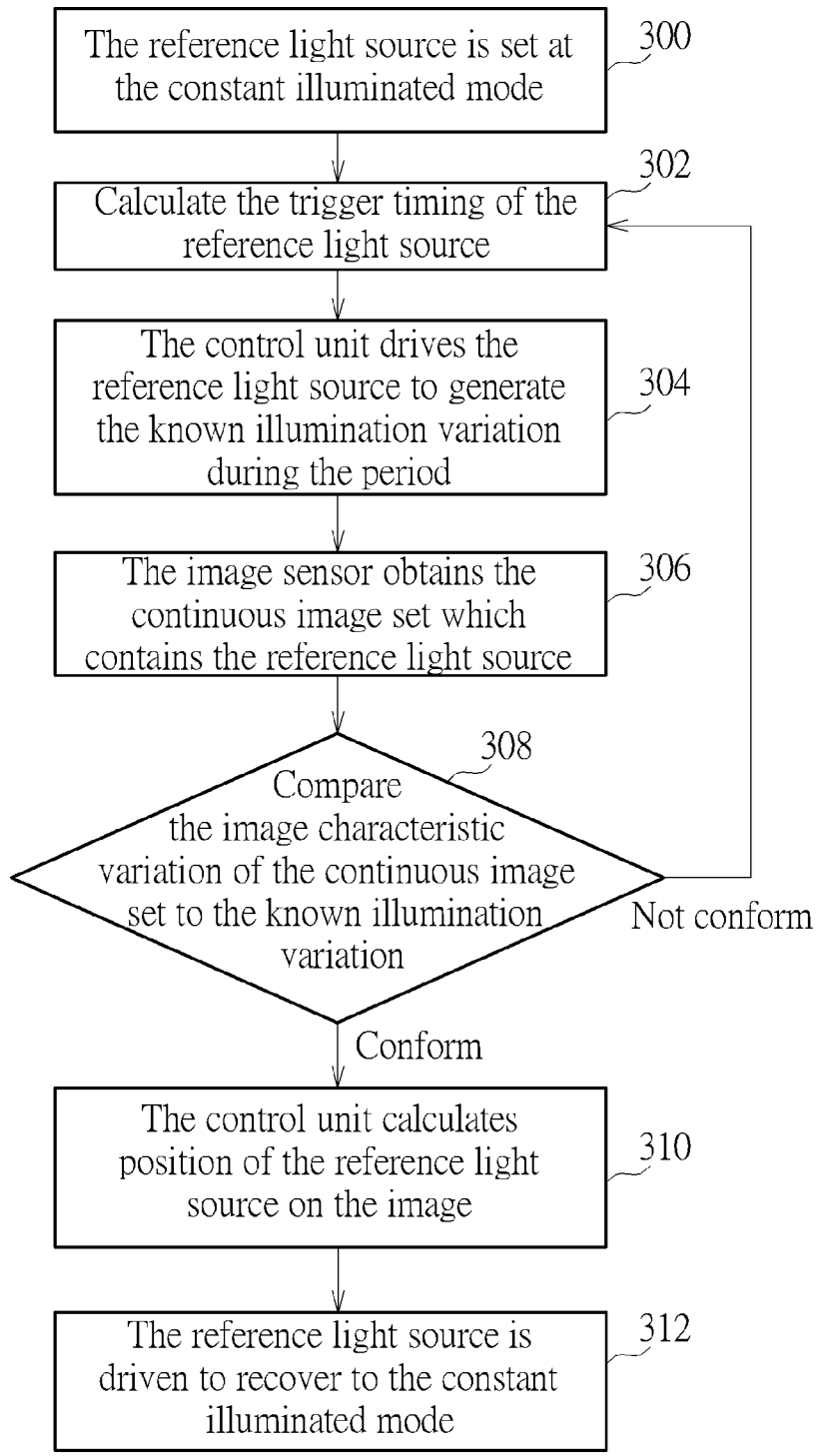
FIG. 3 is a flow chart of an optical tracking method according to the first embodiment of the present invention.

Please refer to FIG.3. FIG.3 is a flow chart of an optical tracking method according to the first embodiment of the present invention. The optical tracking method illustrated in FIG.3 is suitable for the optical tracking system 10 shown in FIG.1 and FIG.2. First, step 300 is executed to set the reference light source 16 at the constant illuminated mode. Then step 302 to step 306 are executed. The period for triggering the reference light source 16 is calculated by the random algorithm or the predetermined algorithm, the control unit 20 outputs the control signal to drive the reference light source 16 to generate the known illumination variation during the period, and the image sensor 18 is simultaneously actuated to immediately obtain the sequential image set. Then, step 308 is executed that the control unit 20 compares the sequential image set to the known illumination variation, to determine whether the position information of the reference light source 16 on the image is calculated or not. As the inconstant illuminated image of the sequential image set does not conform to the known illumination variation, the control unit 20 individually identifies the different object images to determine that the reference light source 16 is set at the constant illuminated mode and the image characteristic variation is resulted by the environmental error of the inconstant illuminated mode. The control unit 20 does not calculate the position information of the reference light source 16, and step 302 is executed. As the inconstant illuminated image of the sequential image set conforms to the known illumination variation, the reference light source 16 is switched to the inconstant illuminated mode, and step 310 is executed that the control unit 20 identifies the reference light source 16, calculates and outputs the position information of the reference light source 16 to the display for object tracking coordinates. Final, step 312 is executed. The control unit 20 recovers the reference light source 16 to the constant illuminated mode after the period is completed.

Figure 4:
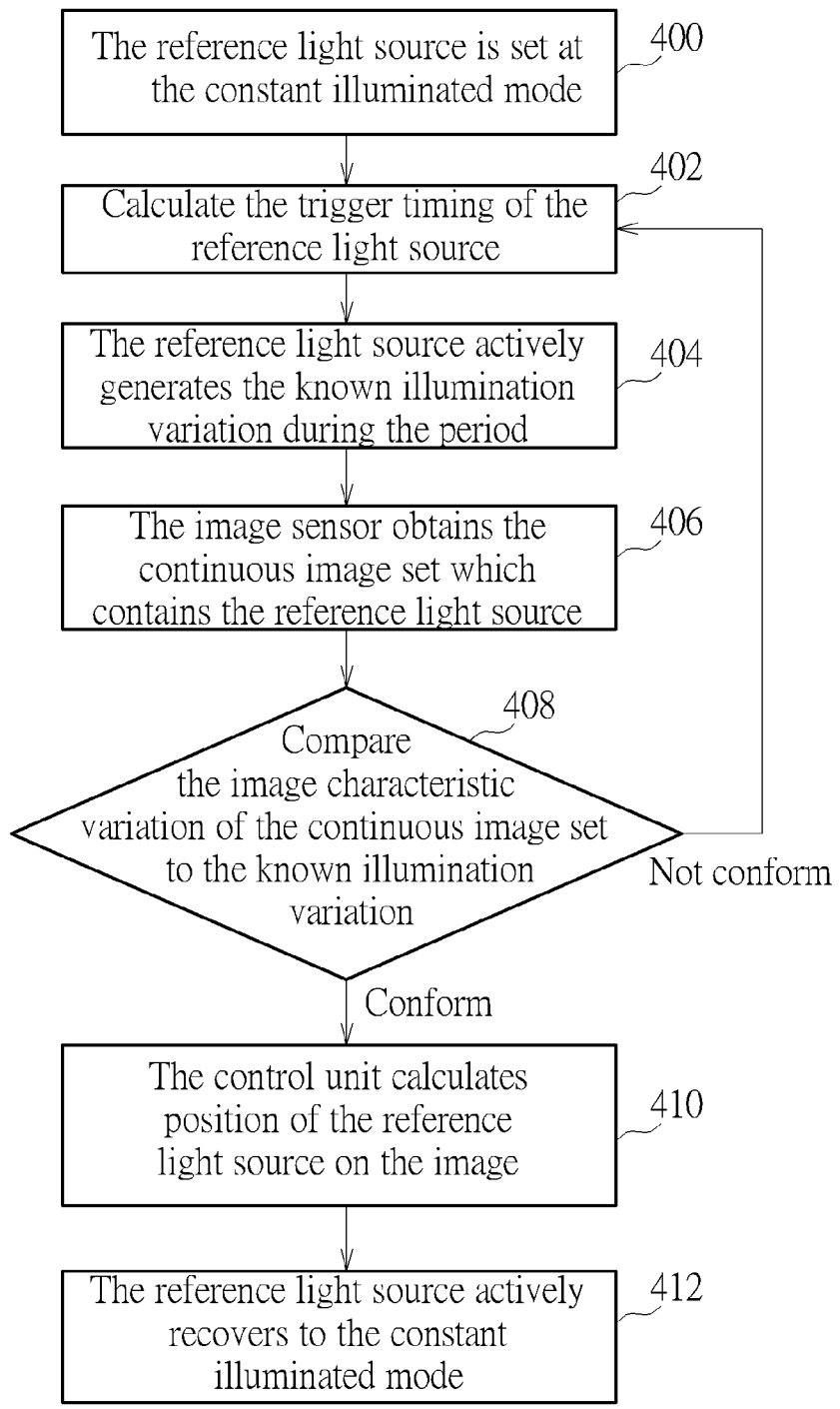
FIG. 4 is a flow chart of the optical tracking method according to the second embodiment of the present invention.

Please refer to FIG.4. FIG.4 is a flow chart of the optical tracking method according to the second embodiment of the present invention. The optical tracking method illustrated in FIG.4 is suitable for the optical tracking system 10 shown in FIG.1 and FIG.2. First, step 400 is executed to set the reference light source 16 at the constant illuminated mode. Then step 402 to step 406 are executed. The period for triggering the reference light source 16 is calculated by the random algorithm or the predetermined algorithm, the reference light source 16 actively generates the known illumination variation during the period, and utilizes the first communication unit 22 and the second communication unit 24 to output the notice message to the remote controller 14, so as to drive the image sensor 18 to obtain the corresponding sequential image set. Then, step 408 is executed that the control unit 20 compares the sequential image set to the known illumination variation, to determine whether the position information of the reference light source 16 on the image is calculated or not. Step 402 is executed as the inconstant illuminated image of the sequential image set does not conform to the known illumination variation. As the inconstant illuminated image of the sequential image set conforms to the known illumination variation, step 410 is executed and the control unit 20 calculates/outputs the position information of the reference light source 16 to be the object tracking coordinates. Final, step 412 is executed that the reference light source 16 actively recovers to the constant illuminated mode. Difference between the second embodiment and the first embodiment is a processor of the reference light source 16 can execute steps 402~406, such as generating the known illumination variation and switching into the constant illuminated mode, and outputs the notice message about property of the known illumination variation to the remote controller 14 via the communication units.

The optical tracking method and the related optical tracking system of the present invention keeps the reference light source at the constant illuminated mode except the period. The reference light source can generate the known illumination variation according to the predetermined algorithm, which means the reference light source is actuated to generate the known illumination variation during the specific period when the control unit cannot accurately acquire the effective reference point, and the remote controller can identify and calibrate position of the reference light source. The reference light source further can generate the known illumination variation by the random algorithm, which means the reference light source calculates/acquires the random time difference, and automatically generates the known illumination variation at each predetermined interval since the random time difference passes. It is to say, the reference light source of the present invention is not the scintillating light source with regular variation. The illumination variation of the reference light source is actuated according to interference of the environmental error or random calculation, and property of the illumination variation is the known parameter of the remote controller. Because the reference light source is not scintillated regularly, the optical tracking system can widely increase turn-on time (the constant illuminated mode) of the reference light source, so that an amount of the effective reference point is increased accordingly. The present invention drives the reference light source to generate the illumination variation during the specific period (the said period can be triggered or actuated by error detection or the random calculation), synchronous control of the reference light source and the image sensor is unnecessary. Therefore, controllable complexity of the reference light source is simplified, and manufacturing cost of the display can be effectively decreased.

In conclusion, the present invention can utilize the reference light source with random scintillation to validly increase object tracking efficiency of the optical tracking system, and to simplify software/hardware of the optical tracking system for low product cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of optically tracking a frame of an object, the method being applied to an optical tracking system having an image sensor and a control unit, the method comprising:
   the image sensor capturing different frames containing continuous imaging variation of a reference light source during an operative period, wherein the frames are defined as a sequential image set, and the reference light source generates a known illumination variation during the operative period;
   the control unit identifying an image characteristic illumination variation of the sequential image set; and
   the control unit comparing the image characteristic illumination variation to the known illumination variation to determine whether a predetermined function is executed.

2. The method of claim 1, further comprising:
   setting the reference light source at a constant illuminated mode except during the operative period.

3. The method of claim 1, wherein the control unit comparing the image characteristic illumination variation to the known illumination variation to determine whether a predetermined function is executed comprises:
   the control unit comparing the image characteristic illumination variation to the known illumination variation to determine whether to execute calculation of position information of the reference light source on the frame of the sequential image set.

4. The method of claim 1, wherein comparing the image characteristic illumination variation to the known illumination variation to determine whether the predetermined function is executed comprises:
   determining whether capturing time of a non-constant illuminated image of the sequential image set conforms to the known illumination variation.

5. The method of claim 4, wherein determining whether the capturing time of the non-constant illuminated image of the sequential image set conforms to the known illumination variation comprises:
   identifying the object with the known illumination variation on the non-constant illuminated image as the reference light source when the non-constant illuminated image conforms to the known illumination variation; and
   generating corresponding coordinates according to position information of the reference light source.

6. The method of claim 4, wherein determining whether the capturing time of the non-constant illuminated image of the sequential image set conforms to the known illumination variation comprises:
   determining the object with the known illumination variation on the non-constant illuminated image being not the reference light source when the non-constant illuminated image does not conform to the known illumination variation.

7. The method of claim 1, further comprising:
   calculating length and trigger timing of the operative period by a random algorithm or a predetermined algorithm.

8. The method of claim 7, wherein the reference light source generates the known illumination variation at each predetermined interval since a random time difference is calculated and passes.

9. The method of claim 1, wherein the method is applied to a remote controller, the remote controller utilizes an image sensor to obtain the sequential image set, and duty cycle of the image sensor is substantially smaller than length of the known illumination variation.

10. The method of claim 9, wherein the remote controller outputs a control signal and transmits the control signal to the reference light source via a communication unit, so as to drive the reference light source to generate the known illumination variation during the operative period.

11. The method of claim 9, wherein the reference light source actively generates the known illumination variation during the operative period, and utilizes a communication unit to output a notice message to the image sensor.

12. The method of claim 1, wherein the known illumination variation of the reference light source includes variation of a dark level and a bright level with specific frequency, or includes the dark level with fixed length.

13. An optical tracking system comprising:
    a display, the display comprising at least one reference light source; and
    a remote controller for obtaining a distance and an angle of the remote controller relative to the display so as to generate corresponding coordinates, the remote controller comprising:
       an image sensor for capturing different frames containing continuous imaging variation of the reference light source during an operative period, and the frames being defined as a sequential image set; and
       a control unit electrically connected to the image sensor, the control unit driving the reference light source to generate a known illumination variation during the operative period, the control unit further identifying an image characteristic illumination variation of the sequential image set, and comparing the image characteristic illumination variation to the known illumination variation, so as to determine whether a predetermined function is executed.

14. The optical tracking system of claim 13, wherein the reference light source is set at a constant illuminated mode except during the operative period.

15. The optical tracking system of claim 13, wherein the control unit executes calculation of position information of the reference light source on a frame of the sequential image set according to a comparison of the image characteristic illumination variation and the known illumination variation.

16. The optical tracking system of claim 13, wherein the display further comprises a first communication unit electrically connected to the reference light source, the remote controller further comprises a second communication unit electrically connected to the control unit, the control unit utilizes the second communication unit and the first communication unit to drive the reference light source to generate the known illumination variation.

17. The optical tracking system of claim 13, wherein the control unit identifies an object with the known illumination variation on a non-constant illuminated image of the sequential image set as the reference light source when capturing time of the non-constant illuminated image conforms to the known illumination variation.

18. The optical tracking system of claim 13, wherein the control unit calculates length and trigger timing of the operative period by a random algorithm or a predetermined algorithm.

19. The optical tracking system of claim 18, wherein the control unit drives the reference light source to generate the known illumination variation at each predetermined interval since a random time difference is calculated and passes.

20. The optical tracking system of claim 13, wherein duty cycle of the image sensor is substantially smaller than length of the known illumination variation.

21. An optical tracking system comprising:
- a display, the display comprising at least one reference light source, the reference light source generating a known illumination variation during an operative period; and
- a remote controller for obtaining a distance and an angle of the remote controller relative to the display so as to generate corresponding coordinates, the remote controller comprising:
  - an image sensor for capturing different frames containing continuous imaging variation of the reference light source during the operative period, and the frames being defined as a sequential image set; and
  - a control unit electrically connected to the image sensor, the control unit identifying an image characteristic illumination variation of the sequential image set, and comparing the image characteristic illumination variation to the known illumination variation, so as to determine whether a predetermined function is executed.

22. The optical tracking system of claim 21, wherein the reference light source is set at a constant illuminated mode except during the operative period.

23. The optical tracking system of claim 21, wherein the control unit executes calculation of position information of the reference light source on a frame of the sequential image set according to a comparison of the image characteristic illumination variation and the known illumination variation.

24. The optical tracking system of claim 21, wherein the display further comprises a first communication unit electrically connected to the reference light source, the remote controller further comprises a second communication unit electrically connected to the control unit, the display utilizes the second communication unit and the first communication unit to output a notice message about the known illumination variation to the remote controller.

25. The optical tracking system of claim 21, wherein the control unit identifies an object with the known illumination variation on a non-constant illuminated image of the sequential image set as the reference light source when capturing time of the non-constant illuminated image conforms to the known illumination variation.

26. The optical tracking system of claim 21, wherein the reference light source calculates length and trigger timing of the operative period by a random algorithm or a predetermined algorithm.

27. The optical tracking system of claim 26, wherein the reference light source generates the known illumination variation at each predetermined interval since a random time difference is calculated and passes.

28. The optical tracking system of claim 21, wherein duty cycle of the image sensor is substantially smaller than length of the known illumination variation.

* * * * *